United States Patent
Karanath Sachidanandan et al.

(10) Patent No.: US 12,445,555 B2
(45) Date of Patent: Oct. 14, 2025

(54) SYSTEMS AND METHODS FOR INTERACTIVE VOICE RESPONSE AUTO-SCALING

(71) Applicant: Home Depot Product Authority, LLC, Atlanta, GA (US)

(72) Inventors: Sanooj Karanath Sachidanandan, Cumming, GA (US); Edson H. Philippe, Atlanta, GA (US); Dan Perritte, Marietta, GA (US)

(73) Assignee: Home Depot Product Authority, LLC, Atlanta, GA (US)

( * ) Notice: Subject to any disclaimer, the term of this patent is extended or adjusted under 35 U.S.C. 154(b) by 0 days.

(21) Appl. No.: 18/407,845

(22) Filed: Jan. 9, 2024

(65) Prior Publication Data
US 2024/0146841 A1 May 2, 2024

Related U.S. Application Data

(63) Continuation of application No. 17/231,478, filed on Apr. 15, 2021, now Pat. No. 11,895,268.
(Continued)

(51) Int. Cl.
*H04M 3/493* (2006.01)
*G06F 9/455* (2018.01)
(Continued)

(52) U.S. Cl.
CPC ........ *H04M 3/493* (2013.01); *G06F 9/45558* (2013.01); *H04M 3/367* (2013.01); *H04M 3/5191* (2013.01); *G06F 2009/4557* (2013.01)

(58) Field of Classification Search
CPC ............... H04M 3/493; H04M 3/4936; H04M 2201/40; H04M 2201/39; H04M 3/5183;
(Continued)

(56) References Cited

U.S. PATENT DOCUMENTS 8,281,020 B2   10/2012   Brunson
8,477,926 B2   7/2013    Jasper
(Continued)

FOREIGN PATENT DOCUMENTS

WO   WO-2018086489 A1 *  5/2018  ........... G06K 9/6267
WO   WO-2020005302 A1 *  1/2020  ........... G06F 3/0482

OTHER PUBLICATIONS

Contact Center Solutions: A Compelling Case for Cloud Contact Centers, Communications Today; Noida (Sep. 2013), 8 pgs.
(Continued)

*Primary Examiner* — Akelaw Teshale
(74) *Attorney, Agent, or Firm* — Greenberg Traurig, LLP

(57) ABSTRACT

Systems and methods for distributing discrete events into a stateless cloud provider architecture are disclosed. Certain embodiments involve receiving, by the load balancer, a scaling up indication for the IVR system, the scaling up indication comprising an identification of a new server to be added to the plurality of servers. The method involves responsive to receiving the scaling up indication, registering the new server for IVR traffic by the load balancer. The method includes after registering the new server, receiving an IVR event. The method includes distributing the IVR event to the new server.

20 Claims, 5 Drawing Sheets

Related U.S. Application Data

(60) Provisional application No. 63/134,781, filed on Jan. 7, 2021.

(51) Int. Cl.
*H04M 3/36* (2006.01)
*H04M 3/51* (2006.01)

(58) Field of Classification Search
CPC . H04M 3/367; H04M 3/5191; G06F 9/45558; G06F 2009/4557; G06F 9/505
See application file for complete search history.

(56) References Cited

U.S. PATENT DOCUMENTS

| | | | |
|---|---|---|---|
| 9,516,169 | B2 | 12/2016 | Reilly |
| 9,544,434 | B1 | 1/2017 | Kammeyer |
| 10,003,691 | B1 | 6/2018 | Agarwa |
| 10,084,911 | B2 | 9/2018 | Hooshiari |
| 10,110,753 | B1 | 10/2018 | Qureshi |
| 10,154,142 | B2 | 12/2018 | Rybachenko |
| 10,306,068 | B1 | 5/2019 | Chadha |
| 10,447,860 | B1 | 10/2019 | Hartman |
| 10,944,867 | B1 * | 3/2021 | Baror ....................... H04M 3/46 |
| 11,082,559 | B1 * | 8/2021 | Koneru .................. H04M 3/527 |
| 2003/0084159 | A1 | 5/2003 | Blewett |
| 2006/0210030 | A1 * | 9/2006 | Reynolds .............. H04M 7/006 379/88.18 |
| 2008/0101335 | A1 * | 5/2008 | Badger ................... H04L 65/80 370/352 |
| 2011/0280390 | A1 * | 11/2011 | Lawson ............... H04M 3/5158 379/229 |
| 2012/0066371 | A1 * | 3/2012 | Patel ................... H04L 67/1031 709/224 |
| 2018/0367672 | A1 * | 12/2018 | Ristock ............... H04M 3/5238 |
| 2020/0014642 | A1 | 1/2020 | Sidi |

OTHER PUBLICATIONS

Myphoneclub Deploys Cloud And IVR Technology, Audiotex Update; Boynton Beach, vol. 25, Iss. 7, https://search.proquest.com/trade-journals/myphoneclub-deploys-cloud-ivr-technology/docview/1397337905/se-2 (Jul. 1, 2012), 3 pgs.

Search Report and Written Opinion issued in International Appl. No. PCT/US21/28389, dated Jul. 26, 2021, 15 pgs.

* cited by examiner

SYSTEMS AND METHODS FOR INTERACTIVE VOICE RESPONSE AUTO-SCALING

RELATED APPLICATION

The present application is a Continuation of U.S. patent application Ser. No. 17/231,478, entitled "SYSTEMS AND METHODS FOR INTERACTIVE VOICE RESPONSE AUTO-SCALING," filed Apr. 15, 2021, which itself claims priority to U.S. Provisional Patent Application Ser. No. 63/134,781, filed Jan. 7, 2021, the disclosures of which are hereby incorporated by reference in their entireties.

TECHNICAL FIELD

This disclosure relates to automatic server scaling for an interactive voice response system.

BACKGROUND

As the digital communication path between customers and retail businesses continues to grow, scaling discrete customer interaction sessions in a cloud computing environment presents a challenge to maintaining security and flexibility of a stateless cloud environment while implementing a discrete session approach.

SUMMARY

Systems and methods for distributing discrete events into a stateless server cloud provider architecture are disclosed. Certain embodiments involve receiving, by the load balancer, a scaling up indication for the IVR system, the scaling up indication comprising an identification of a new server to be added to the plurality of servers. The method involves responsive to receiving the scaling up indication, registering the new server for IVR traffic by the load balancer. The method includes after registering the new server, receiving an IVR event. The method includes distributing the IVR event to the new server.

Certain embodiments involve monitoring, by the load balancer, a number of active IVR sessions for one or more IVR servers of the plurality of IVR servers. The method involves responsive to monitoring the number of active IVR sessions, determining that the number of IVR sessions for one or more IVR servers is less than a session threshold. The method further describes generating a scaling down indication for the IVR system, the scaling down indication comprising an identification of a selected server to be removed from the plurality of servers. The method further includes responsive to generating the scaling down indication, de-registering the selected server from IVR traffic by the load balancer. The method further includes, after de-registering the selected server, preventing assignment of an IVR event to the selected server. The method further includes communicating, by the IVR system and to a cloud provider, a request for termination of the selected server.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION

The present disclosure includes systems and methods for distributing discrete events, such as interactive voice response (IVR) events, into a stateless server architecture, including when the architecture scales up by adding one or more servers to handle increased event volume, and when the architecture scales down by removing one or more servers. While the scale up and scale down operation are described separately herein to aid understanding, it will be appreciated that these operations can be integrated into a single dynamic autoscaling solution, in some embodiments. That is, a set of servers may implement both the scale up and scale down functionality of this disclosure in conjunction to autoscale.

Figure 1:
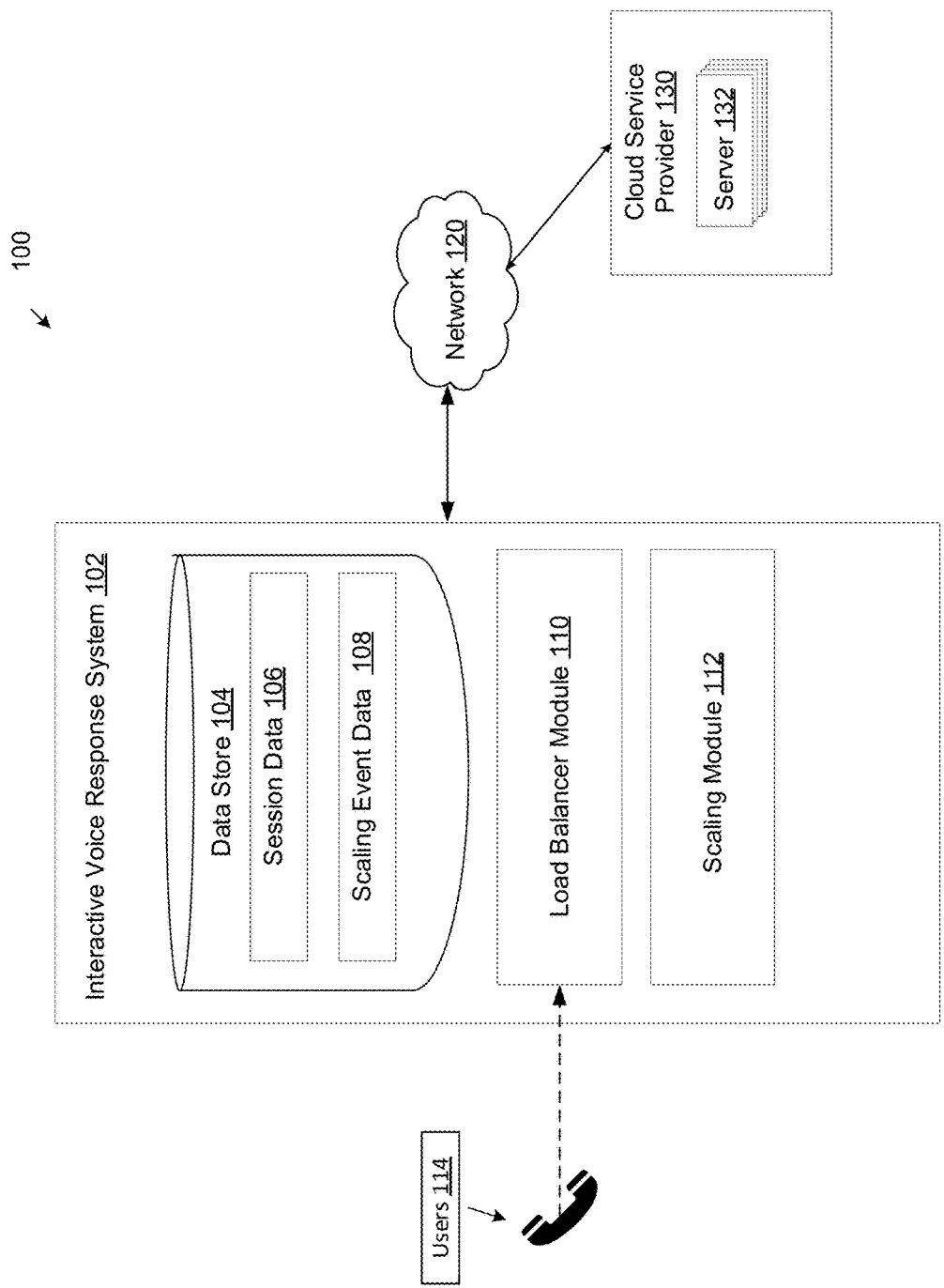
FIG. 1 is a block diagram illustrating an example of a system for implementing autoscaling for an interactive voice response system, according to certain aspects of the present disclosure.

Referring now to the drawings, wherein like numerals refer to the same or similar features in the various views, FIG. 1 is a block diagram illustrating an example of a system for implementing autoscaling for an interactive voice response system. The system 100 may include an interactive voice response (IVR) system 102, a network 120, and a cloud service provider 130. The IVR system 102 may provide automated responses to input from users 114 through a telephone communication system (e.g., land-line, cellular phone, smart phone, etc.). In embodiments, the IVR system 102 may route customer calls to the appropriate recipient and/or provide verbal information in response to user input in the form of verbal commands or touch input on the user's device.

The IVR system 102 may include a data store 104, load balancer module 110, and scaling module 112. The IVR system 102 may be communicatively coupled to a network 120 using one or more network interface devices and further to the cloud service provider 130 via the network 120. The IVR system 102 may send and receive commands and/or requests to the cloud service provider 130. The network 120 may include known wireless and/or wired networks.

The load balancer module 110 and scaling module 112 may be implemented as separate or combined software and hardware resources. The load balancer module may be generally configured to distribute IVR events and sessions to respective servers 132 provided by the cloud service provider in order to balance the respective load for each active server 132. The load balancer may be a session initiation protocol (SIP) supported load balancer. In some cases, the load balancer may assign an IVR event to an active server 132 and will not reassign that IVR event to another respective server 132 during the IVR event. The scaling module 112 may be configured to perform one or more actions in response to a scaling command, which one or more actions may enable existing and additional IVR events to be processed correctly.

In some embodiments, the cloud service provider 130 may be or may include a stateless cloud service that provides one or more servers 132 to the IVR system 102, which servers 132 may service the IVR events received by the IVR system 102. The cloud service provider 130 may include any number of servers 132 based on a usage of the IVR system 102.

The IVR system 102 may be configured to receive a plurality of IVR events from users 114, and to direct each IVR event, or a session associated with the event, to a specific one of the servers 132. The IVR system 102 and/or a server 132 may open a respective session for each IVR event.

The cloud service provider 130 may monitor the demand on the servers 132 and determine an appropriate number of servers to provide to the IVR system 102 on an ongoing, dynamic basis. Accordingly, the cloud service provider 130 may determine, based on a volume and/or trend of session requests from the IVR system 102, and/or based on other data, that a scaling event is necessary to provide one or more additional or fewer servers for allocation to the IVR system 102. The cloud service provider 130 may communicate a scaling notification to the IVR system 102. In response to the scaling notification, the IVR system 102 may communicate a command to the cloud service provider 130 to add or remove servers for allocation to the IVR system 102.

The IVR system 102 may be configured to receive a scaling notification from the cloud service provider 130. The IVR system 102 may communicate a scaling up command that may include, in some embodiments, an identification of one or more servers to be added to or removed from the set of servers available to the IVR system 102. In the example of adding servers, the IVR system 102 may register a new server with the load balancer module 110 and distribute events to the new server.

In some embodiments, the load balancer module 110 may distribute calls/sessions to servers evenly, such that each of the servers of the cloud service provider handles a similar number of sessions. In some embodiments, the scaling module 112 may compute a threshold usage for each server of the cloud provider (based on a known processing capacity and a known memory capacity of the servers provided by the cloud provider) and trigger a scaling threshold (e.g., 60% capacity) to the cloud provider. For instance, the load balancer module 110 may calculate the capacity of each server of the cloud provider and maintains distributed loads below the scaling trigger threshold, which may be lower than the scaling-up threshold used by the cloud provider. Thus, the load balancer module 110 ensures capacity during the time interval between when the scaling up trigger is initiated and when the new server is online. During a scaling event, the load balancer module 110 may continue to distribute new sessions to existing servers until the new server (s) has been fully online. The scaling threshold is set by the scaling module 112 such that the existing servers can process new sessions until the new server is fully operational.

The IVR system 102 may further include a data store 104. The data store 104 may include session data 106 and scaling event data 108. In one aspect, the IVR system 102 may utilize the session data 106 as a historical repository of session parameters such as session length, subject matter of session (e.g., a topic or inquiry category), rating of session effectiveness, or other parameters that characterize an IVR session. The IVR system 102 may predict, such as by using scaling module 112, a future session requirement based on one or more of the session parameters.

The IVR system 102 may store historical scaling events in scaling event data 108. Examples of scaling event data 108 include historical scaling events and associated scaling data such as timestamp, scaling factor (e.g., a measure of scale in servers or percentage of capacity), direction of scaling (upscale or downscale), and other factors relevant to the scaling determination.

The scaling module 112 may provide one or more applications or scripts that indicate new sessions to be distributed by the load balancer module 110. In one example, the scaling module 112 may determine, using machine learning, a predicted capacity of sessions at a future time and analyze whether the scaling event needs to be increased using a prediction of a further increase in voice sessions.

In operation, a user 114 may place a phone call (e.g., with a mobile phone or other client device), and the user's phone call may be routed to the IVR system 102. The IVR system 102 may regard the call as an IVR event. Upon receiving the call (i.e., in response to an IVR event), the IVR system 102 may open an IVR session, which session may endure for as long as the user phone call remains open. The IVR system 102 may select a specific server 132 according to the load experienced by each server 132 and may assign the session to the selected server 132. The IVR system 102 may perform these steps for each of a plurality of calls received from users. Accordingly, at any given time, a plurality of servers 132 may each be processing a respective one or more IVR sessions, and the IVR system 102 may distribute further sessions to the servers 132 based on the specific load on each available server 132. Based on the overall load on the servers collectively, the cloud service provider 130 may increase or decrease the number of servers 132 available to the IVR system 102.

For instance, an IVR system may use a cloud service provider to provide interactive voice services to a group of users. The IVR system may create a discrete respective session for each voice event. A voice event may include, for example, a user telephone, voice-over-IP (VOIP), or similar call. In turn, a session may include communication between the calling user and the IVR system, with the IVR system providing automated voice responses to the user's input. The IVR system may assign a specific voice event to a specific server provided by the cloud provider using a load balancer to distribute multiple specific voice events across the multiple specific server instances of the cloud provider. The cloud provider may scale the number of servers based on the amount of traffic received from the load balancer and communicate the cloud scaling back to the IVR system. The IVR system may use this information from the cloud provider to reconfigure the distribution schema or allocate incoming discrete sessions to the additional servers that are instantiated. The IVR system controls the distribution of voice events such that the stateless cloud provider does not receive discrete session information about the voice events, thereby preserving the security advantages of a stateless cloud. However, the IVR system distributing the voice events in this manner allows the IVR system to have states and realize the benefits of a stateful configuration simultaneously. It will be appreciated that various software modules described with regard to FIG. 1 can be integrated into other software modules and perform some or all functions of the integrated modules (e.g., the load balancer can perform functions of the scaling module)

Figure 2:
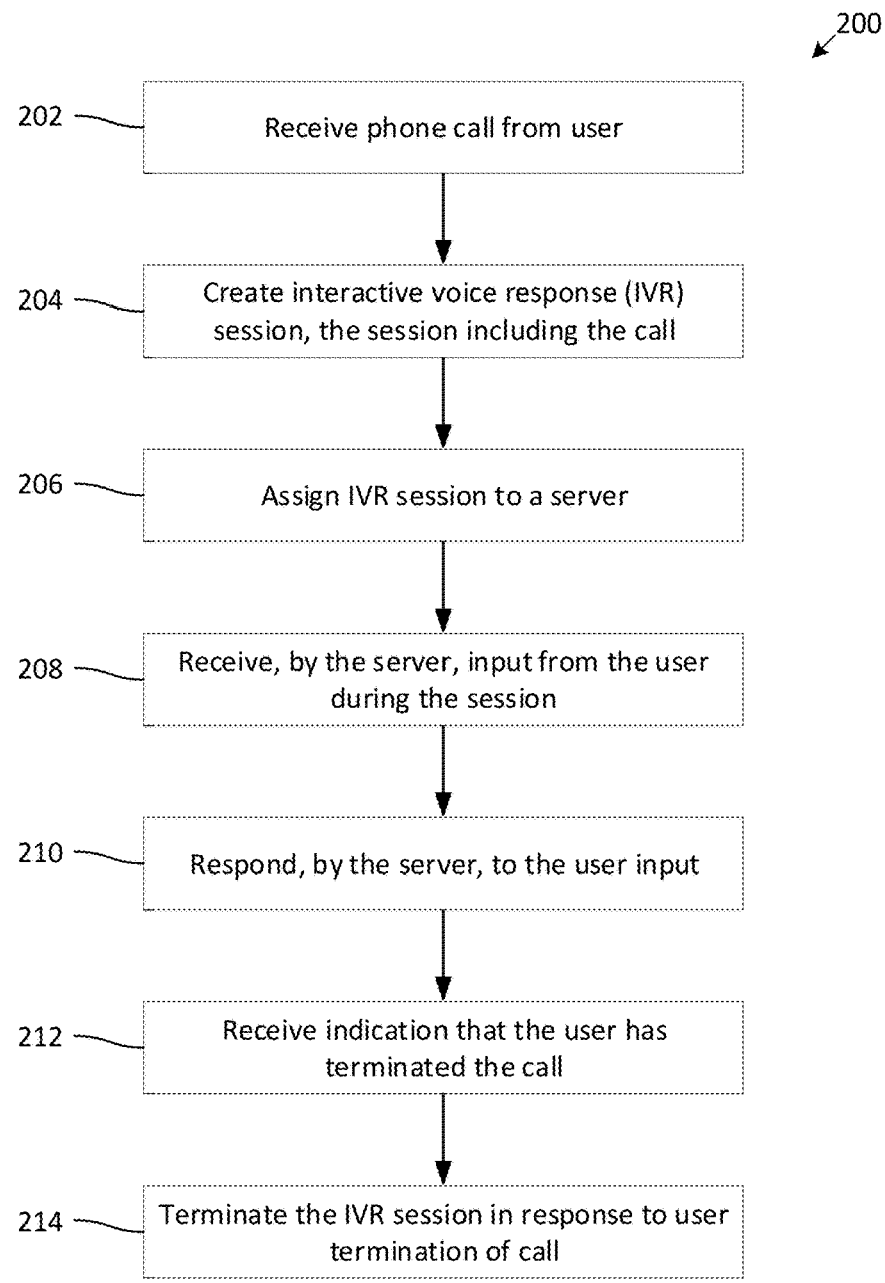
FIG. 2 is a flow chart illustrating an example method of operating an interactive voice response system, according to certain aspects of the present disclosure.

FIG. 2 is a flow chart illustrating an example method 200 of operating an interactive voice response system. One or more portions of the method 200 may be performed by the system 100 of FIG. 1, in embodiments.

The method 200 may include, at block 202, receiving a phone call from a user. The phone call may be received by a load balancer of an IVR system, in some embodiments.

The method 200 may further include, at block 204, creating an IVR session, the IVR session including the call received at block 202. In one example creating a session may include associating the phone call with one or more items of data, including but not limited to a source internet protocol address (IP) and destination IP, the calling user's telephone number, the telephone number dialed by the user, one or more session initiation protocol (SIP) messages, unique identifiers (e.g., session IDs, cloud instance IDs, etc.), voice packets, current state data, and/or other relevant data.

The method 200 may further include, at block 206, assigning the IVR session created at block 204 to a server. The server may be, in some embodiments, one of a plurality of servers available for processing a phone call so as to provide an IVR service to the caller. Block 206 may include determining the load on one or more of the plurality of servers and assigning the IVR session to a server according to a predetermined load balancing strategy.

The method 200 may further include, at block 208, receiving, by the server to which the IVR session was assigned in block 206, input from the calling user during the IVR session. The user input may be voice input, touch tone input, and/or other input that may be transmitted by the user in or along with a phone call.

The method 200 may further include, at block 210, responding, by the server, to the user input. The server responses may be the primary function of the IVR system. For example, the server may respond by routing the user's phone call to a desired recipient, providing information to the user, or asking follow-up or clarifying questions to the user, for example.

The method 200 may further include, at block 212, receiving an indication that the user has terminated the call. The indication may be received by a load balancer or other component of the IVR in front of the server processing the call. The indication may be received from the server that is processing the IVR session, may be received from the user, and/or from another source, in embodiments. In one example, an IVR session may be terminated and the IVR system may receive a SIP message that indicates session termination from a telephony provider. The IVR server may log session data, clear memory caches, and perform other operations in response to termination of the IVR session.

The method 200 may further include, at block 214, terminating the IVR session in response to receiving the indication that the user terminated the call. Terminating the IVR session may include, for example, logging session data, clearing session data, storing session parameters, or the like.

Figure 3:
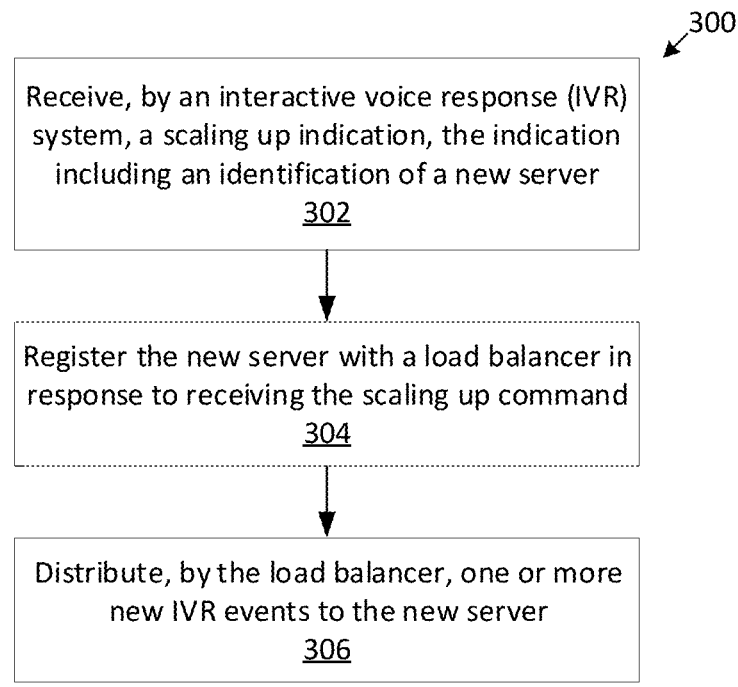
FIG. 3 is a flow chart illustrating an example method for autoscaling an interactive voice response system. according to certain aspects of the present disclosure.

FIG. 3 is a flow chart illustrating an example method for autoscaling an IVR system. Referring to FIG. 1, the method 300, or one or more portions thereof, may be performed by the IVR system 102.

At block 302, the method 300 may include receiving, by the load balancer, a scaling up indication for the IVR system, the scaling up indication comprising an identification of a new server to be added to the plurality of servers. For example, the IVR system may be communicatively coupled to a cloud service provider. The IVR system may receive commands/requests from the cloud service provider.

The IVR system may receive multiple types of commands or notifications and may determine, after receiving a command/notification from the cloud service provider, that any specific number of IVR servers should be created or destroyed. In some cases, the IVR system may determine that a scaling event is occurring because the cloud service provider's notification includes a threshold excess capacity of IVR servers, a threshold of CPU utilization, a request for sessions rate, or other metric that indicates a scaling event.

In one embodiment, the IVR system may determine that the scaling event (e.g., by analyzing the cloud service provider notification) indicates an upscaling. For instance, the IVR system may determine that an increased number of IVR servers are being created in response to a relationship between current or forecast sessions and a threshold excess capacity of IVR servers, a threshold of CPU utilization, a request for sessions rate, or another metric.

At block 304, the method 300 may include registering the new server with a load balancer in response to receiving the scaling up command. The load balancer module may communicate with the cloud service provider to determine an identification of the new server instance to register. The load balancer module can register the new server with a virtual machine ID, a cloud service provider instance identifier, or other unique identifier for the newly created server with a server instance. In some cases, more than one new server is registered concurrently, and the scaling module may provide each additional server with registration details as described with regard to a single server upscale above.

At block 306, the method 300 may include distributing one or more new IVR events to the new server. For example, the load balancer module can receive a new interactive voice event (where "new" indicates that the IVR event is assigned after the new server is registered with the load balancer) and assign the interactive voice event to the new server that was registered with the load balancer module. The load balancer may distribute one or more new interactive voice events to the new server. In some cases when the scaling module indicates that more than one new server has been initiated, the load balancer may distribute new sessions to the new servers in any combination, or according to a predetermined or adaptive load balancing schema. In some embodiments, although new IVR events may be distributed to the new server, IVR events that were already assigned and that were being processed by existing servers may continue to be processed by the same existing servers. In other words, when the new server is added, existing IVR sessions may be unchanged, in some embodiments.

Figure 4:
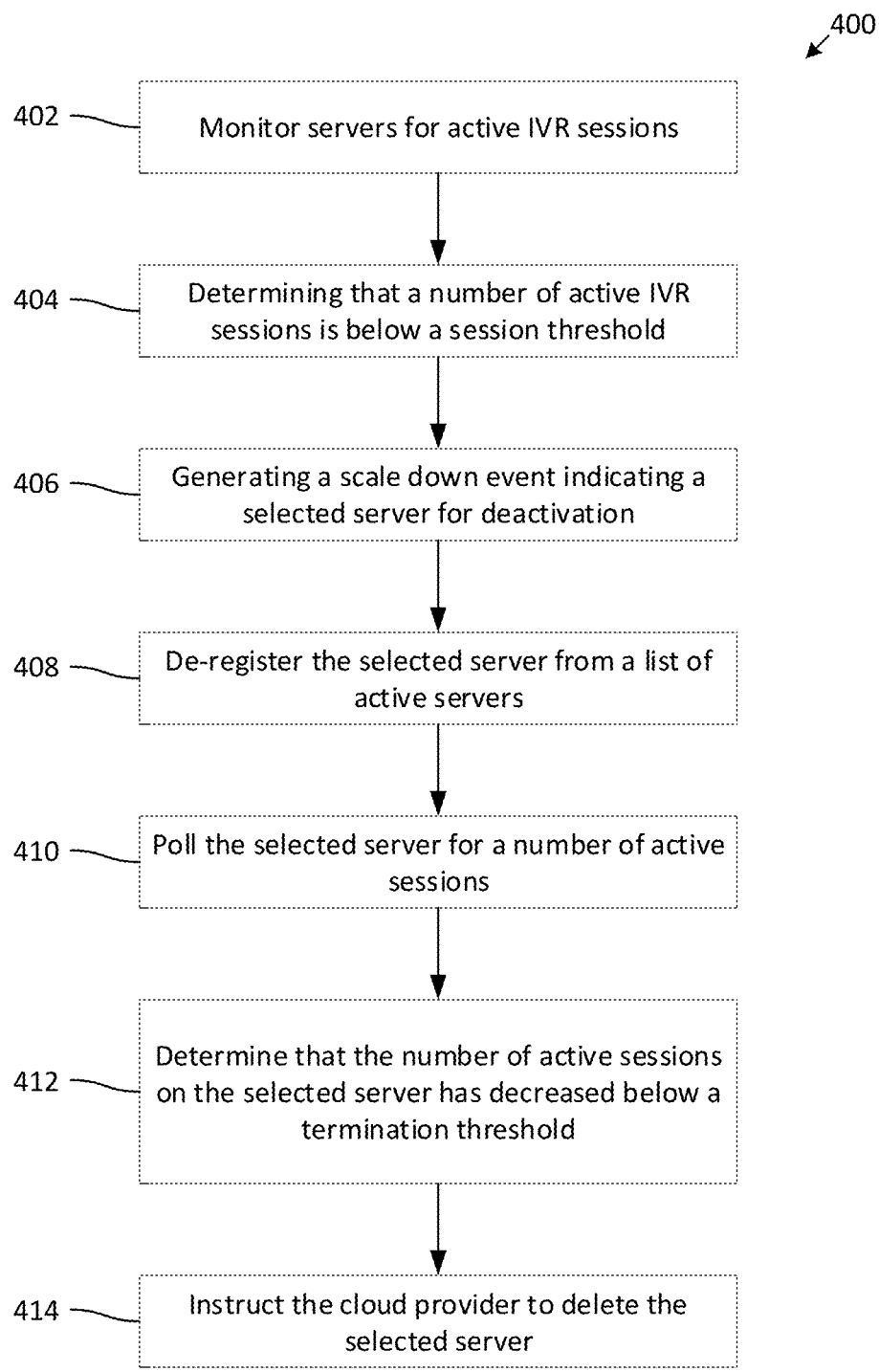
FIG. 4 depicts flow chart illustrating another example method for autoscaling, such as downscaling of an interactive voice response system according to certain aspects of the present disclosure.

FIG. 4 is a flow chart illustrating an example method 400 of operating an interactive voice response system. One or more portions of the method 400 may be performed by the system 100 of FIG. 1, in embodiments.

The method 400 may include, at block 402, monitoring servers for active IVR sessions. The scaling module may monitor each server to determine a number of active IVR sessions. While the description of FIG. 4 will be given with regard to a server, it will be appreciated that the method 400 may be performed for multiple servers simultaneously without departing from the contents of the present disclosure.

The method 400 may further include, at block 404, determining that a number of active IVR sessions is below a session threshold. In one example determining a number of active IVR sessions may include polling (e.g., polling a cloud service provider for) active IVR sessions for each server. The scaling module may compare the number of active IVR sessions to a session threshold. If the number of active IVR sessions is below the threshold, a server from the plurality of servers may be deactivated without significant loss of IVR system responsiveness. In some embodiments, the IVR session threshold may be expressed as a percentage or other proportion of capacity for one or more servers. In some embodiments, the IVR session threshold may be expressed as a percentage or other proportion of the total capacity of the plurality of active servers. In one example, the session threshold may be set as a trigger threshold (e.g., 30% capacity) that indicates a scale down event can be communicated to the cloud provider.

One challenge of implementing a stateful system, such as an IVR system, on a stateless set of cloud servers is that native scaling-down functionality of the servers may result in handling of ongoing processes to be moved from a server to be shut down to a still active server. Such movement, when applied to a stateful IVR session, may terminate the session, and thus is undesirable.

In some embodiments, the session threshold may be higher than a scaling-down threshold used by the cloud provider. Thus, although the cloud provider may have native scaling-down functionality, the higher scaling down threshold of the load balancer module ensures that active IVR sessions on a server are completed before the cloud provider deletes a server from a list of servers to which IVR sessions may be assigned. An active session may be identified by analyzing session attributes that are associated with the server, including but not limited to, a source internet protocol address (IP) and destination IP, the calling user's telephone number, the telephone number dialed by the user, one or more session initiation protocol (SIP) messages, unique identifiers (e.g., session IDs, cloud instance IDs, etc.), voice packets, current state data, and/or other relevant data. For example, a session ID without an associated SIP termination message may be indicative of a single active session.

In one aspect, an IVR session is initiated when the server receives an SIP invite message that may correspond to a user initiating a call to the IVR server. The IVR server may respond with on or more messages that may indicate a state of the IVR server such as, but not limited to TRYING, RINGING, 200 OK, ACK, BYE, or the like. The IVR server may use these messages to complete a handshake with the device of the user initiating the call and open up a voice channel (e.g., RTP protocol). The IVR server may assign a unique identifier for each message to identify and track the status. Each message may contain multiple attributes such as originating phone number, destination phone number, electronic address of a device (e.g., IP, MAC, IMEI, etc.), protocol, any proxy involved in the communication channel, a codec negotiated between the IVR server and device of the user. The IVR server may store these attributes as state information and update the state information based on connection/session progress during an IVR session life cycle. The IVR server may update the state information for failure or timeout of any of these messages or voice packets during a connected IVR session. The IVR server may also update the state information when a session is terminated.

The method 400 may further include, at block 406, generating a scale down event indicating a selected server for deactivation. In one example, the scaling module may select a server having a number of active IVR sessions below the session threshold for deactivation. The scaling module may generate a scale down event including an identification of one or more servers to be removed from the set of servers available to the IVR system.

The method 400 may further include, at block 408, de-registering the selected server from a list of active servers. The load balancer module may de-register the selected server with the load balancer module, thereby preventing distribution of IVR events received after de-registration to the selected server.

The method 400 may further include, at block 410, polling the selected server for a number of active sessions. The scaling module may communicate with the selected server at a periodic interval to determine the number of active sessions remaining on the selected server. For instance, at a first time when the load balancer de-registers the selected server, the selected server may have a number of active sessions that are desirable to complete before terminating the operation of the server.

The method 400 may further include, at block 412, determining that the number of active sessions on the selected server have decreased to a number at or below a termination threshold. In one example, the scaling module may determine that there all active sessions with the selected server have been terminated (i.e., a termination threshold of zero) and no active sessions will be lost by terminating the server. In another example, the scaling module may determine, based on an analysis of session data (e.g., session length, session activity, inactivity time during session, etc.) of an active session, that the termination threshold may be set at a non-zero number of sessions. In this example, the active sessions may be low-priority or low-value sessions and loss of these sessions by terminating the server may not negatively impact operation of the IVR system.

The method 400 may further include, at block 414, instructing the cloud provider to delete the selected server based on the scale down event. For instance, the IVR system may communicate with the cloud service provider to delete the selected server from the plurality of servers operating by the cloud service provider. The IVR system may communicate that the server is below the termination threshold and may be terminated. The cloud provider may terminate the server by removing the operating parameters (e.g., memory, CPU processing power, storage, etc.) from the cloud service.

As a result of bocks 406-414, a cloud-deployed IVR system may scale down and remove servers in an organized fashion without undesired termination of sessions by determining that a particular server is no longer required, ceasing distribution of tasks to that server, and monitoring activity on that server to instruct removal/deletion of the server when appropriate.

Figure 5:
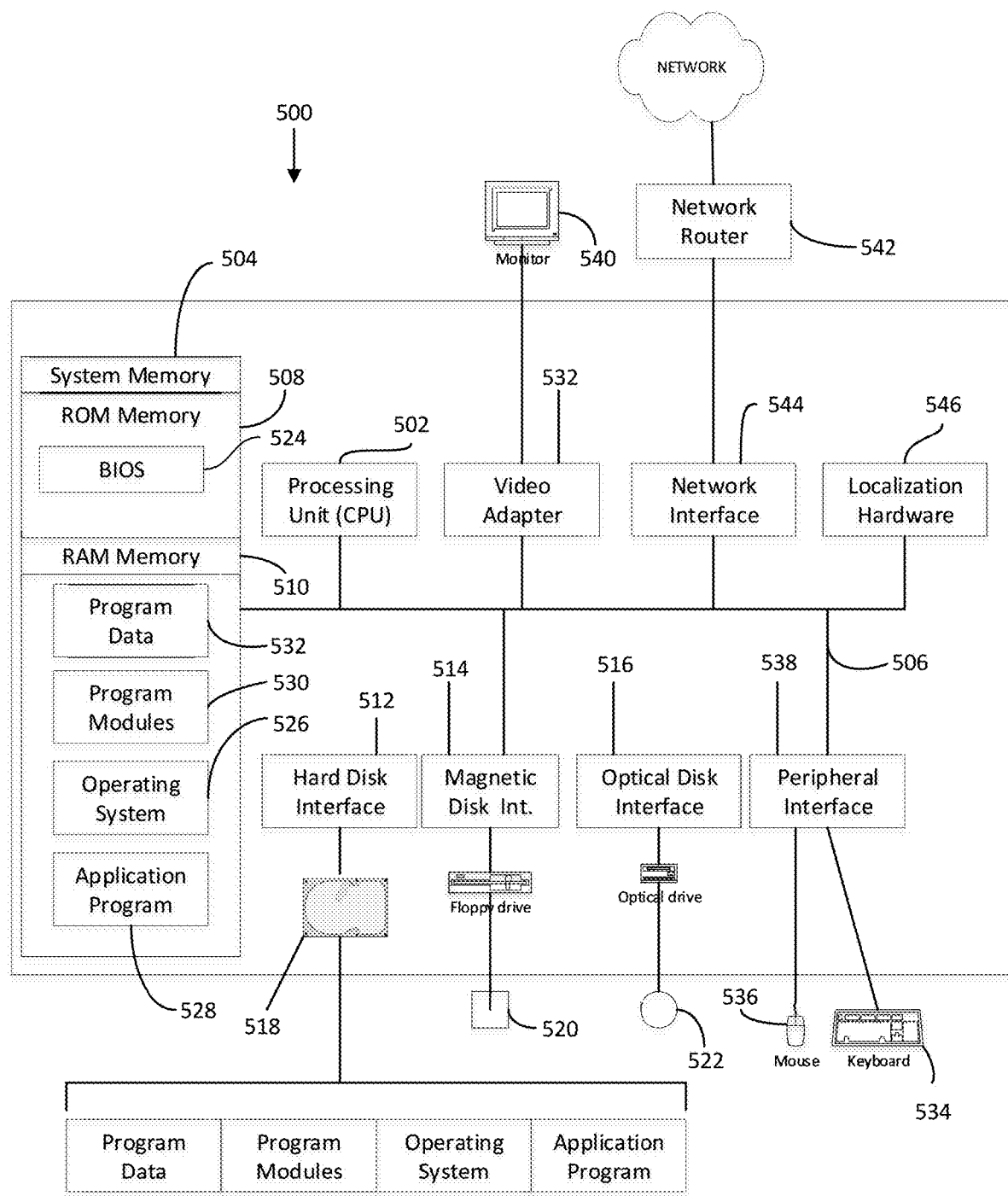
FIG. 5 depicts an example of a computing system for implementing certain aspects of the present disclosure.

FIG. 5 depicts an example of a computing system for implementing certain aspects of the present disclosure. FIG. 5 include a computing system environment 500, such as a desktop computer, laptop, smartphone, tablet, or any other such device having the ability to execute instructions, such as those stored within a non-transient, computer-readable medium. Furthermore, while described and illustrated in the context of a single computing system 500, those skilled in the art will also appreciate that the various tasks described hereinafter may be practiced in a distributed environment having multiple computing systems 500 linked via a local or wide-area network in which the executable instructions may be associated with and/or executed by one or more of multiple computing systems 500.

In its most basic configuration, computing system environment 500 typically includes at least one processing unit 502 and at least one memory 504, which may be linked via a bus 506. Depending on the exact configuration and type of computing system environment, memory 504 may be volatile (such as RAM 510), non-volatile (such as ROM 508, flash memory, etc.) or some combination of the two. Computing system environment 500 may have additional features and/or functionality. For example, computing system environment 500 may also include additional storage (removable and/or non-removable) including, but not limited to, magnetic or optical disks, tape drives and/or flash drives. Such additional memory devices may be made accessible to the computing system environment 500 by means of, for example, a hard disk drive interface 512, a magnetic disk drive interface 514, and/or an optical disk drive interface 516. As will be understood, these devices, which would be linked to the system bus 506, respectively, allow for reading from and writing to a hard drive 518, reading from or writing to a removable magnetic disk 520, and/or for reading from or writing to a removable optical disk 522, such as a CD/DVD ROM or other optical media. The drive interfaces and their associated computer-readable media allow for the nonvolatile storage of computer readable instructions, data structures, program modules and other data for the computing system environment 500. Those skilled in the art will further appreciate that other types of computer readable media that can store data may be used for this same purpose. Examples of such media devices include, but are not limited to, magnetic cassettes, flash memory cards, digital videodisks, Bernoulli cartridges, random access memories, nanodrives, memory sticks, other read/write and/or read-only memories and/or any other method or technology for storage of information such as computer readable instructions, data structures, program modules or other data. Any such computer storage media may be part of computing system environment 500.

A number of program modules may be stored in one or more of the memory/media devices. For example, a basic input/output system (BIOS) 524, containing the basic routines that help to transfer information between elements within the computing system environment 500, such as during start-up, may be stored in ROM 508. Similarly, RAM 510, hard drive 518, and/or peripheral memory devices may be used to store computer executable instructions comprising an operating system 526, one or more applications programs 528 (which may include the functionality of the IVR system 102 of FIG. 1, for example), other program modules 530, and/or program data. Still further, computer-executable instructions may be downloaded to the computing system environment 500 as needed, for example, via a network connection.

An end-user may enter commands and information into the computing system environment 500 through input devices such as a keyboard 534 and/or a pointing device 536. While not illustrated, other input devices may include a microphone, a joystick, a game pad, a scanner, etc. These and other input devices would typically be connected to the processing unit 502 by means of a peripheral interface 538 which, in turn, would be coupled to bus 506. Input devices may be directly or indirectly connected to processor 502 via interfaces such as, for example, a parallel port, game port, firewire, or a universal serial bus (USB). To view information from the computing system environment 500, a monitor 540 or other type of display device may also be connected to bus 506 via an interface, such as via video adapter 532. In addition to the monitor 540, the computing system environment 500 may also include other peripheral output devices, not shown, such as speakers and printers.

The computing system environment 500 may also utilize logical connections to one or more computing system environments. Communications between the computing system environment 500 and the remote computing system environment may be exchanged via a further processing device, such as a network router 542, that is responsible for network routing. Communications with the network router 542 may be performed via a network interface component 544. Thus, within such a networked environment, e.g., the Internet, World Wide Web, LAN, or other like type of wired or wireless network, it will be appreciated that program modules depicted relative to the computing system environment 500, or portions thereof, may be stored in the memory storage device(s) of the computing system environment 500.

The computing system environment 500 may also include localization hardware 546 for determining a location of the computing system environment 500. In embodiments, the localization hardware 546 may include, for example only, a GPS antenna, an RFID chip or reader, a WiFi antenna, or other computing hardware that may be used to capture or transmit signals that may be used to determine the location of the computing system environment 500.

The computing environment 500, or portions thereof, may comprise one or more components of the system 100 of FIG. 1, in embodiments.

In some aspects, a method of controlling a scalable interactive voice response (IVR) system is described including a plurality of IVR servers and a load balancer. The method includes receiving, by the load balancer, a scaling up indication for the IVR system, the scaling up indication comprising an identification of a new server to be added to the plurality of servers. The method may further include responsive to receiving the scaling up indication, registering the new server for IVR traffic by the load balancer. The method may further include receiving an IVR event after registering the new server. The method may further include distributing the IVR event to the new server.

In another aspect, the method may include receiving, by the load balancer, the scaling up indication from a stateless cloud platform and the interactive voice response system is a stateful system.

In another aspect, the method may include the cloud platform initiating a stateless scaling event and wherein the interactive voice response system adjusts a number of discrete available sessions from a cloud platform capacity.

In another aspect, the method may include registering the new server. The method may further include adding to a list of available servers, by the load balancer, the new server with one or more of a virtual machine ID, a cloud service provider instance identifier, or other unique identifier.

In another aspect, the method may include after registering the new server, distributing each of a plurality of new IVR events to one of the new server or one of the plurality of servers according to a predetermined load balancing schema.

In another aspect, the method may include an IVR event that represents an interaction between the IVR system and a user of a mobile device.

In some aspects, a method for operating a scalable interactive voice response (IVR) system is disclosed, the IVR system including a plurality of IVR servers and a load balancer. The method may include monitoring, by the load balancer, a number of active IVR sessions for one or more IVR servers of the plurality of IVR servers. The method may further include responsive to monitoring the number of active IVR sessions, determining that the number of IVR sessions for one or more IVR servers is less than a session threshold. The method may further include generating a scaling down indication for the IVR system, the scaling down indication comprising an identification of a selected server to be removed from the plurality of servers. The method may further include responsive to generating the scaling down indication, de-registering the selected server from IVR traffic by the load balancer. The method may further include after de-registering the selected server, preventing assignment of an IVR event to the selected server. The method may further include communicating, by the IVR system and to a cloud provider, a request for termination of the selected server.

In another aspect, the load balancer communicates the scaling down indication to a stateless cloud platform and the IVR system is a stateful system.

In another aspect, the IVR system adjusts a number of discrete available sessions from a cloud platform capacity and wherein the cloud platform initiates a stateless down-scaling event based on the discrete available sessions.

In another aspect de-registering the selected server includes removing from a list of available servers, by the load balancer, the selected server with one or more of a virtual machine ID, a cloud service provider instance identifier, or other unique identifier.

In another aspect, the method may include after de-registering the selected server, preventing a new IVR event from being assigned to the selected server and removing the selected server from a load balancing schema.

In another aspect, the method may include an IVR event that represents an interaction between the IVR system and a user of a mobile device.

In some aspects, a method for operating a scalable interactive voice response (IVR) system is disclosed, the IVR system comprising a plurality of IVR servers provided by a cloud platform and a load balancer. The method may include monitoring, by the load balancer, a number of active IVR sessions for one or more IVR servers of the plurality of IVR servers. The method may further include responsive to monitoring the number of active IVR sessions at a first time, determining that the number of active IVR sessions for one or more IVR servers indicates a first scaling event based on comparing the number of active IVR sessions with a session threshold. The method may include applying, based on the first scaling event, a first scaling operation to the plurality of IVR servers, wherein the applying the first scaling operation comprises receiving, by the load balancer, a scaling up indication for the IVR system, the scaling up indication comprising an identification of a new server to be added to the plurality of IVR servers. The method may include responsive to receiving the scaling up indication, registering the new server for IVR traffic by the load balancer. The method may include after registering the new server, receiving an IVR event. The method may include distributing the IVR event to the new server, The method may include responsive to monitoring the number of active IVR sessions at a second time, determining that the number of active IVR sessions for one or more IVR servers indicates a second scaling event based on comparing the number of active IVR sessions with a session threshold. The method may include applying, based on the second scaling event, a second scaling operation to the plurality of IVR servers, wherein the applying the second scaling operation comprising generating a scaling down indication for the IVR system, the scaling down indication comprising an identification of a selected server to be removed from the plurality of IVR servers, and responsive to the scaling down indication, de-registering the selected server from IVR traffic by the load balancer, and after de-registering the selected server, preventing assignment of an IVR event to the selected server, and communicating, by the IVR system and to a cloud provider, a request for termination of the selected server.

The method may include the load balancer receiving the scaling up indication from a stateless cloud platform and the IVR system is a stateful system.

The method may include the cloud platform initiating a stateless scaling event and wherein the IVR system adjusts a number of discrete available sessions from a cloud platform capacity.

The method may include registering the new server comprising adding to a list of available servers, by the load balancer, the new server with one or more of a virtual machine ID, a cloud service provider instance identifier, or other unique identifier.

The method may include after registering the new server, distributing each of a plurality of new IVR events to one of the new server or one of the plurality of servers according to a predetermined load balancing schema.

The method may include the load balancer communicating the scaling down indication to a stateless cloud platform and the IVR system is a stateful system.

The method may include the IVR system adjusting a number of discrete available sessions from a cloud platform capacity and wherein the cloud platform initiates a stateless down-scaling event based on the discrete available sessions.

The method may include de-registering the selected server comprising removing from a list of available servers, by the load balancer, the selected server with one or more of a virtual machine ID, a cloud service provider instance identifier, or other unique identifier.

While this disclosure has described certain embodiments, it will be understood that the claims are not intended to be limited to these embodiments except as explicitly recited in the claims. On the contrary, the instant disclosure is intended to cover alternatives, modifications and equivalents, which may be included within the spirit and scope of the disclosure. Furthermore, in the detailed description of the present disclosure, numerous specific details are set forth in order to provide a thorough understanding of the disclosed embodiments. However, it will be obvious to one of ordinary skill in the art that systems and methods consistent with this disclosure may be practiced without these specific details. In other instances, well known methods, procedures, components, and circuits have not been described in detail as not to unnecessarily obscure various aspects of the present disclosure.

Some portions of the detailed descriptions of this disclosure have been presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic data capable of being stored, transferred, combined, compared, and otherwise manipulated in a computer system or similar electronic computing device. For reasons of convenience, and with reference to common usage, such data is referred to as bits, values, elements, symbols, characters, terms, numbers, or the like, with reference to various presently disclosed embodiments. It should be borne in mind, however, that these terms are to be interpreted as referencing physical manipulations and quantities and are merely convenient labels that should be interpreted further in view of terms commonly used in the art. Unless specifically stated otherwise, as apparent from the discussion herein, it is understood that throughout discussions of the present embodiment, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers, or other such information storage, transmission, or display devices as described herein or otherwise understood to one of ordinary skill in the art.

What is claimed is:

1. A method for operating a scalable interactive voice response (IVR) system, the IVR system comprising a plurality of IVR servers, the method comprising:
   receiving an IVR event;
   retrieving a plurality of historical scaling events;
   deriving at least one session parameter from the plurality of historical scaling events;
   determining a predicted session requirement based on the received IVR event and on the derived at least one session parameter; and
   assigning the IVR event to one of the plurality of IVR servers based on the predicted session requirement.

2. The method of claim 1, wherein the IVR event represents an interaction between the IVR system and a user of a mobile device.

3. The method of claim 1, wherein the at least one session parameter from comprises one or more of:
   a timestamp of an historical scaling event of the plurality of historical scaling events;
   a scaling factor of an historical scaling event of the plurality of historical scaling events; or
   a direction of scaling for an historical scaling event of the plurality of historical scaling events.

4. The method of claim 1, wherein the determining the predicted session requirement utilizes machine learning.

5. The method of claim 1, wherein:
   the IVR system further comprises a load balancer;
   the predicted session requirement comprises determining that a capacity of the plurality of IVR servers is less than a predicted number of sessions, and
   the method further comprises:
      in response to the capacity of the plurality of IVR servers being less than the predicted number of sessions, generating a scaling up indication for the IVR system, the scaling up indication comprising an identification of a new server to be added to the plurality of servers; and
      responsive to receiving the scaling up indication, registering the new server for IVR traffic by the load balancer.

6. The method of claim 5, wherein the assigning the IVR event to one of the plurality of IVR servers comprises assigning the IVR event to the new server.

7. The method of claim 5, wherein the load balancer communicates the scaling up indication to a stateless cloud platform and the IVR system is a stateful system.

8. The method of claim 1, wherein:
   determining the predicted session requirement comprises determining that a capacity of the plurality of IVR servers exceeds a predicted number of sessions, and
   the method further comprises:
      in response to determining that the capacity of the plurality of IVR servers exceeds the predicted number of sessions, generating a scaling down indication for the IVR system, the scaling down indication comprising an identification of a selected server to be removed from the plurality of servers;
      responsive to generating the scaling down indication, de-registering the selected server from IVR traffic by the load balancer;
      after de-registering the selected server, preventing assignment of the IVR event to the selected server; and
      communicating, by the IVR system to a cloud provider, a request for termination of the selected server.

9. The method of claim 8, wherein the IVR system further comprises a load balancer, wherein de-registering the selected server comprises:
   removing from a list of available servers, by the load balancer, the selected server with one or more of a virtual machine ID, a cloud service provider instance identifier, or other unique identifier.

10. A method for operating a scalable interactive voice response (IVR) system, the IVR system comprising a plurality of IVR servers and a load balancer, the method comprising:
    retrieving a plurality of historical scaling events;
    deriving at least one session parameter from the plurality of historical scaling events;
    determining that a capacity of the plurality of IVR servers is less than a predicted number of sessions on the derived at least one session parameter;
    in response to the capacity of the plurality of IVR servers being less than the predicted number of sessions, generating a scaling up indication for the IVR system, the scaling up indication comprising an identification of a new server to be added to the plurality of servers;
    responsive to receiving the scaling up indication, registering the new server for IVR traffic by the load balancer;
    receiving an IVR event; and
    assigning the IVR event to the new server.

11. The method of claim 10, wherein the IVR event represents an interaction between the IVR system and a user of a mobile device.

12. The method of claim 10, wherein the at least one session parameter comprises one of more of:
    a timestamp of an historical scaling event of the plurality of historical scaling events;
    a scaling factor of an historical scaling event of the plurality of historical scaling events; or
    a direction of scaling for an historical scaling event of the plurality of historical scaling events.

13. The method of claim 10, wherein the determining the predicted number of sessions utilizes machine learning.

14. The method of claim 10, wherein the load balancer communicates the scaling up indication to a stateless cloud platform and the IVR system is a stateful system.

15. The method of claim 14, wherein the cloud platform initiates a stateless scaling event and wherein the interactive voice response system adjusts a number of discrete available sessions from a cloud platform capacity.

16. A method for operating a scalable interactive voice response (IVR) system, the IVR system comprising a plurality of IVR servers and a load balancer, the method comprising:

retrieving a plurality of historical scaling events;

deriving at least one session parameter from the plurality of historical scaling events;

determining that a capacity of the plurality of IVR servers exceeds a predicted number of sessions on the derived at least one session parameter;

in response to the capacity of the plurality of IVR servers being less than the predicted number of sessions, generating a scaling down indication for the IVR system, the scaling down indication comprising an identification of a selected server to be removed from the plurality of servers;

responsive to generating the scaling down indication, de-registering the selected server from IVR traffic by the load balancer;

after de-registering the selected server, preventing assignment of an IVR event to the selected server; and communicating, by the IVR system to a cloud provider, a request for termination of the selected server.

17. The method of claim 16, wherein de-registering the selected server comprises:

removing from a list of available servers, by the load balancer, the selected server with one or more of a virtual machine ID, a cloud service provider instance identifier, or other unique identifier.

18. The method of claim 16, wherein the determining the predicted number of sessions utilizes machine learning.

19. The method of claim 16, wherein the load balancer communicates the scaling down indication to a stateless cloud platform and the IVR system is a stateful system.

20. The method of claim 19, wherein the cloud platform initiates a stateless scaling event and wherein the interactive voice response system adjusts a number of discrete available sessions from a cloud platform capacity.

* * * * *